(12) United States Patent
Sutivong et al.

(10) Patent No.: US 8,077,654 B2
(45) Date of Patent: Dec. 13, 2011

(54) AUXILIARY FL MIMO PILOT TRANSMISSION IN 1XEV-DO

(75) Inventors: Arak Sutivong, Bangkok (TH); Avneesh Agrawal, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 933 days.

(21) Appl. No.: 11/507,787

(22) Filed: Aug. 21, 2006

(65) Prior Publication Data

US 2007/0070928 A1   Mar. 29, 2007

Related U.S. Application Data

(60) Provisional application No. 60/710,367, filed on Aug. 22, 2005.

(51) Int. Cl.
*H04W 4/00* (2009.01)
*H04B 7/185* (2006.01)
(52) U.S. Cl. .................. 370/328; 370/318; 370/329
(58) Field of Classification Search .............. 370/328, 370/318, 329
See application file for complete search history.

(56) References Cited

U.S. PATENT DOCUMENTS

| | | | |
|---|---|---|---|
| 2004/0131041 A1 | 7/2004 | Tirkkonen | |
| 2004/0132494 A1 | 7/2004 | Tirkkonen et al. | |
| 2004/0160921 A1 | 8/2004 | Kaipainen et al. | |
| 2005/0201334 A1* | 9/2005 | Roh et al. | 370/334 |
| 2006/0199577 A1* | 9/2006 | Ramakrishna et al. | 455/422.1 |

FOREIGN PATENT DOCUMENTS

| | | |
|---|---|---|
| JP | 9261761 A | 10/1997 |
| JP | 2004515152 T | 5/2004 |
| JP | 2007513584 T | 5/2007 |
| WO | 0101604 A | 1/2001 |
| WO | WO0245293 A2 | 6/2002 |
| WO | 0208935 8 A | 11/2002 |
| WO | WO2005057870 | 6/2005 |

OTHER PUBLICATIONS

Haidong Zhu et al: "Capacity of pilot-aided MIMO communication systems" Information Theory, 2004. ISIT 2004. Proceedings International Symposium on Chicago, Illinois, USA Jun. 27-Jul. 2, 2004, pp. 544-544, xp010750255, ISBN: 0-7803-8280-3. International Search Report and Written Opinion—PCT/US2006/032768, International Search Authority—European Patent Office—Dec. 2, 2007.
Taiwanese Search report—095130861—TIPO—Jul. 14, 2010.
Translation of Office Action in Japanese application 2008-528069 corresponding to U.S. Appl. No. 11/507,787, citing US20040132494.
WO02089358A1,JP9261761,WO2005057870 an JP2004515152. Dated Jan. 18, 2011.

* cited by examiner

*Primary Examiner* — Kamran Afshar
*Assistant Examiner* — Omoniyi Obayanju
(74) *Attorney, Agent, or Firm* — Donald C. Kordich

(57) ABSTRACT

Systems and methodologies are described that facilitate providing auxiliary multiple-input, multiple-output (MIMO) pilot signals to MIMO user devices in a wireless communication environment. According to some aspects, a portion of data transmission power may be reallocated for auxiliary MIMO pilot transmission during a data segment in a time slot, in order to permit a MIMO user device to perform CQI and rank prediction. Additionally or alternatively, non-MIMO pilot transmission power may be reallocated in a pilot segment in the time slot for transmission of an auxiliary MIMO pilot signal to permit the MIMO user device to demodulate data transmitted in data segments of the time slot. MIMO pilot signals may additionally be time-division multiplexed within or across time slots and may be transmitted over available Walsh codes in data and control segments.

27 Claims, 13 Drawing Sheets

AUXILIARY FL MIMO PILOT TRANSMISSION IN 1XEV-DO

CLAIM OF PRIORITY UNDER 35 U.S.C. §119

This application claims the benefit of U.S. Provisional Application Ser. No. 60/10,367, entitled "A METHOD PILOT TRANSMISSION IN MIMO SYSTEM," filed on Aug. 22, 2005, and assigned to the assignee hereof and hereby expressly incorporated by reference herein.

BACKGROUND

I. Field

The following description relates generally to wireless communications, and more particularly to improving transmission throughput in a wireless communication environment.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

As user devices are improved with regard to processor speed, memory space, transceiver power and/or sensitivity, so does device capability exceed previous versions of respective user devices. However, older, less capable user devices that are still in circulation require support as well. An issue then arises with respect to efficiently supporting existing legacy user devices while concurrently providing support for newer, more capable devices and permitting such devices to fully exploit their functionality.

Therefore, a need exists in the art for systems and methods that overcome the afore-mentioned deficiencies and facilitate accommodating a wide variety of user device types and capabilities in a wireless communication environment in order to improve system throughput and enhance user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to various aspects, pilot signals may be provided to access terminals in, for instance, a data optimized (DO) communication environment for channel estimation and channel quality indication. Multiple-input, multiple-output (MIMO) access terminals may require more pilot information than non-MIMO devices. Auxiliary MIMO pilot signals may thus be transmitted in a manner such that they are orthogonal to data signals, (e.g., transmitted on different tones in an OFDMA system), or may be transmitted in a non-orthogonal manner (e.g., overlapped with data signals). Transmission power may be reallocated from various sources to support auxiliary MIMO user devices when transmitting a communication signal with control segments designed primarily for single-input-single-output (SISO) devices. For example, information transmitted in the communication signal may comprise orthogonal frequency-division multiplexed (OFDM) MIMO data segments, which may be interspersed with control segments comprising SISO, or non-MIMO, pilot signals. When a MIMO system is overlaid on a non-MIMO system such as a SISO system, it may become desirable to provide auxiliary MIMO pilot signal(s) to permit a MIMO access terminal to perform channel estimation and other various protocols.

According to an aspect, a method of providing auxiliary pilots for transmission from a base station in a wireless communication environment may comprise reallocating transmission power for transmission of at least one auxiliary multiple-input, multiple-output (MIMO) pilot in a transmission time slot, and transmitting the at least one auxiliary MIMO pilot on one or more unused Walsh codes during the transmission time slot. Transmission power may be reallocated from a data segment for transmission of the MIMO pilot at low power to permit rank and CQI estimation, or from a non-MIMO control segment to permit demodulation of data. MIMO pilots may additionally be time-division multiplexed.

According to another aspect, an apparatus that facilitates providing auxiliary MIMO pilots for transmission from a base station in a wireless communication environment may comprise a processor that reallocates transmission power for transmission of at least one auxiliary MIMO pilot signal in a time slot and a transmitter that transmits the at least one auxiliary MIMO pilot signal on one or more unused Walsh codes during the time slot. The apparatus may additionally comprise a modulator that time-division multiplexes auxiliary MIMO pilot signals. The processor may reallocate a portion of data transmission power during a data segment in the time slot and/or may reallocate non-MIMO pilot transmission power for transmission of the MIMO pilot during a control segment of the time slot.

According to still another aspect, a wireless communication apparatus may comprise means for reallocating transmission power for transmission of an auxiliary multiple-input, multiple-output (MIMO) pilot in a transmission time slot, means for time-division multiplexing auxiliary MIMO pilots, and means for transmitting the auxiliary MIMO pilot on one or more unused Walsh codes during the transmission time slot. The means for reallocating may reallocate power from either or both of data transmission power and non-MIMO pilot transmission power to support MIMO pilot transmission.

Yet another aspect relates to a computer-readable medium having stored thereon computer-executable instructions for reallocating transmission power for transmission of an auxiliary multiple-input, multiple-output (MIMO) pilot in a transmission time slot, time-division multiplexing auxiliary MIMO pilots; and transmitting the auxiliary MIMO pilot on one or more unused Walsh codes during the transmission time slot.

According to still another aspect, processor that executes computer-executable instructions for reallocating transmission power for transmission of an auxiliary multiple-input, multiple-output (MIMO) pilot in a transmission time slot, time-division multiplexing auxiliary MIMO pilots, and transmitting the auxiliary MIMO pilot on one or more unused Walsh codes during the transmission time slot.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
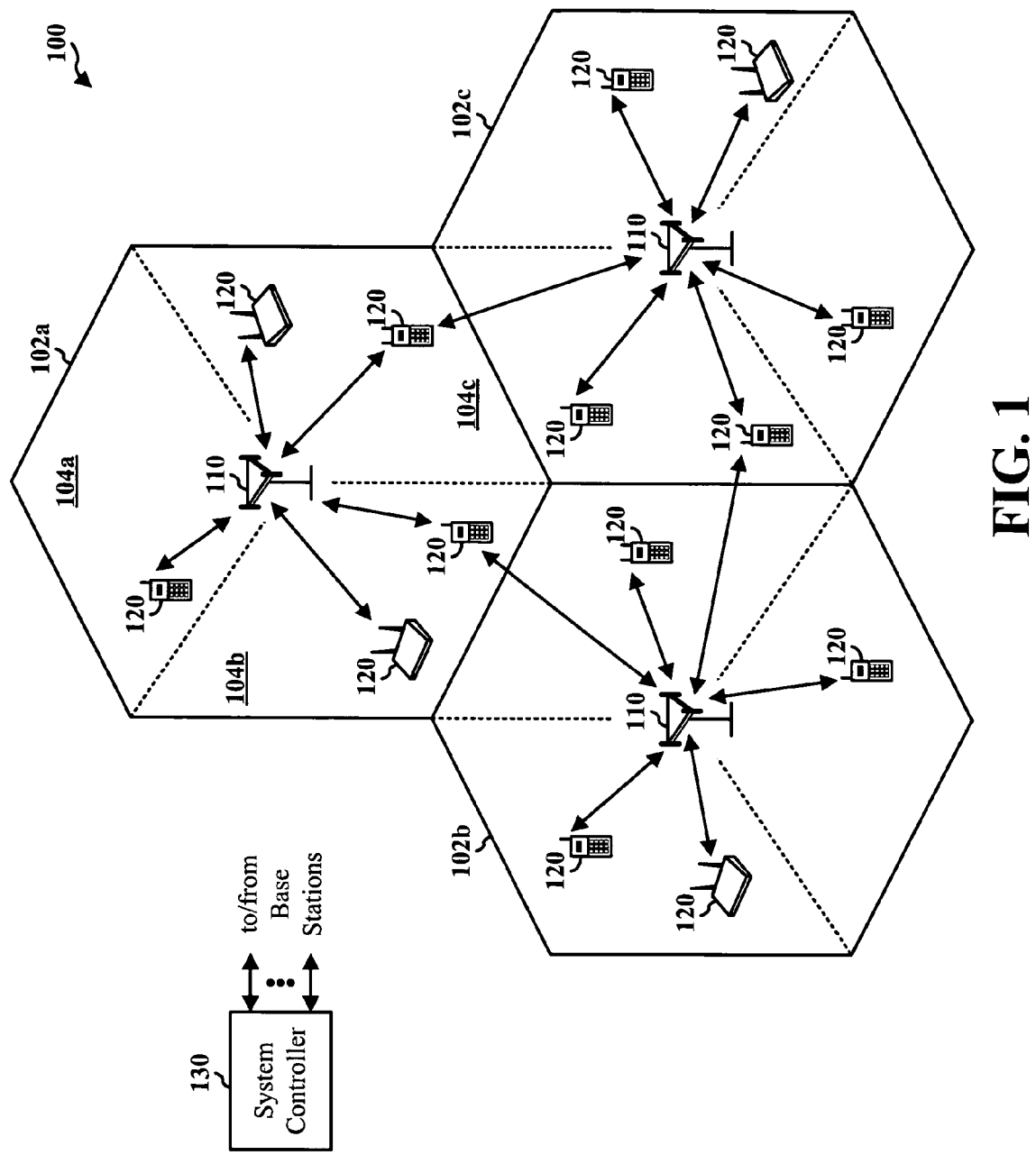
FIG. 1 illustrates a wireless communication system with multiple base stations and multiple terminals, in accordance with one or more aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. It will be appreciated that the word "exemplary" is used herein to mean "serving as an example, instance, or illustration." Any embodiment or design described herein as "exemplary" is not necessarily to be construed as preferred or advantageous over other embodiments or designs.

FIG. 1 illustrates a wireless communication system 100 with multiple base stations 110 and multiple terminals 120, which may be employed in conjunction with one or more aspects described herein. A base station is generally a fixed station that communicates with the terminals and may also be called an access point, a Node B, or some other terminology. Each base station 110 provides communication coverage for a particular geographic area 102. The term "cell" can refer to a base station and/or its coverage area depending on the context in which the term is used. To improve system capacity, a base station coverage area may be partitioned into multiple smaller areas (e.g., three smaller areas), according to FIG. 1, 104*a*, 104*b*, and 104*c*. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal may be fixed or mobile. A terminal may also be called a mobile station, user equipment, a user device, an access terminal, or some other terminology. A terminal may be a wireless device, a cellular phone, a personal digital assistant (PDA), a wireless modem card, and so on. Each terminal 120 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 may communicate with one another as needed. Data transmission on the forward link occurs from one access point to one access terminal at or near the maximum data rate that can be supported by the forward link and/or the communication system. Additional channels of the forward link (e.g., control channel) may be transmitted from multiple access points to one access terminal. Reverse link data communication may occur from one access terminal to one or more access points.

The data to be transmitted to access terminal 120 can be received by access network controller 130. Thereafter, access network controller 130 may send the data to all access points in the access terminal 120 active set. Alternatively, access network controller 130 may first determine which access point was selected by the access terminal 120 as the serving access point, and then send the data to the serving access point. The data can be stored in a queue at the access point(s). A paging message may then be sent by one or more access points to access terminal 120 on respective control channels. Access terminal 120 demodulates and decodes the signals on one or more control channels to obtain the paging messages.

In accordance with various aspects, multiple-input multiple-output (MIMO) transmission techniques such as spatial multiplexing, eigen-beamforming, and space-division multiple access (SDMA) may be utilized by base stations 110. Such techniques are effective in achieving high spectral efficiency and performance in wireless systems. MIMO protocols may be used with any modulation or access technique. However, implementation may be simplified, especially at high data rates, when implementing MIMO techniques in conjunction with orthogonal frequency division multiplexing (OFDM). For example, users may be time-division multiplexed (e.g., one user receives at a time) on the forward link of a data-optimized (DO) system. A common pilot may be transmitted from base stations 110 in midambles of each forward link (FL) time slot. Based on the received pilot power, interference level, previous transmission statistics, etc., each access terminal 120 may provide an indication to the base station 110 of a desired FL data rate. The base station 110 may then determine an access terminal 120 to which to schedule a next transmission and a data rate for the transmission based the access terminal's buffer level, QoS, fairness metrics, etc.

In order to integrate MIMO into a DO system with minimal interruption to existing legacy single-input single-output (SISO) users, an existing DO physical layer may be replaced with a MIMO-OFDM physical layer in a FL slot in which a MIMO access terminal is scheduled. Within a MIMO-OFDM slot, additional support such as control signaling and auxiliary pilots may be provided. Changes may be made within a MIMO-OFDM slot so long as the existing DO control structure, such as FL pilot and medium access channel (MAC) bursts, is kept intact. A preamble signaling structure may additionally be modified for MIMO users (e.g., by redefining the message, signaling scheme, etc.) without causing signal degradation to existing legacy SISO users, as access terminals are not required to decode the ensuing payload unless they can correctly decode the preamble. That is, as far as SISO access terminals are concerned, MIMO-OFDM slots look the same as slots that are not intended for SISO access terminals.

Separate channel estimates from all transmit antennas may be provided to a MIMO access terminal in order to permit the MIMO access terminal to generate feedback information to support MIMO transmissions. Feedback information may comprise CQI (e.g., one for each MIMO layer, etc.) and rank information (e.g., wherein rank is a function of a number of modulation symbols that may be simultaneously transmitted in a MIMO system), and may be obtained upon scheduling of a MIMO access terminal. Each MIMO access terminal may be given frequent access to a channel estimate in order to provide timely and up-to-date feedback to the base station. When no MIMO access terminals have been scheduled for a while, various techniques and protocols may be employed to supply auxiliary pilots for MIMO access terminals in the DO system.

Figure 2:
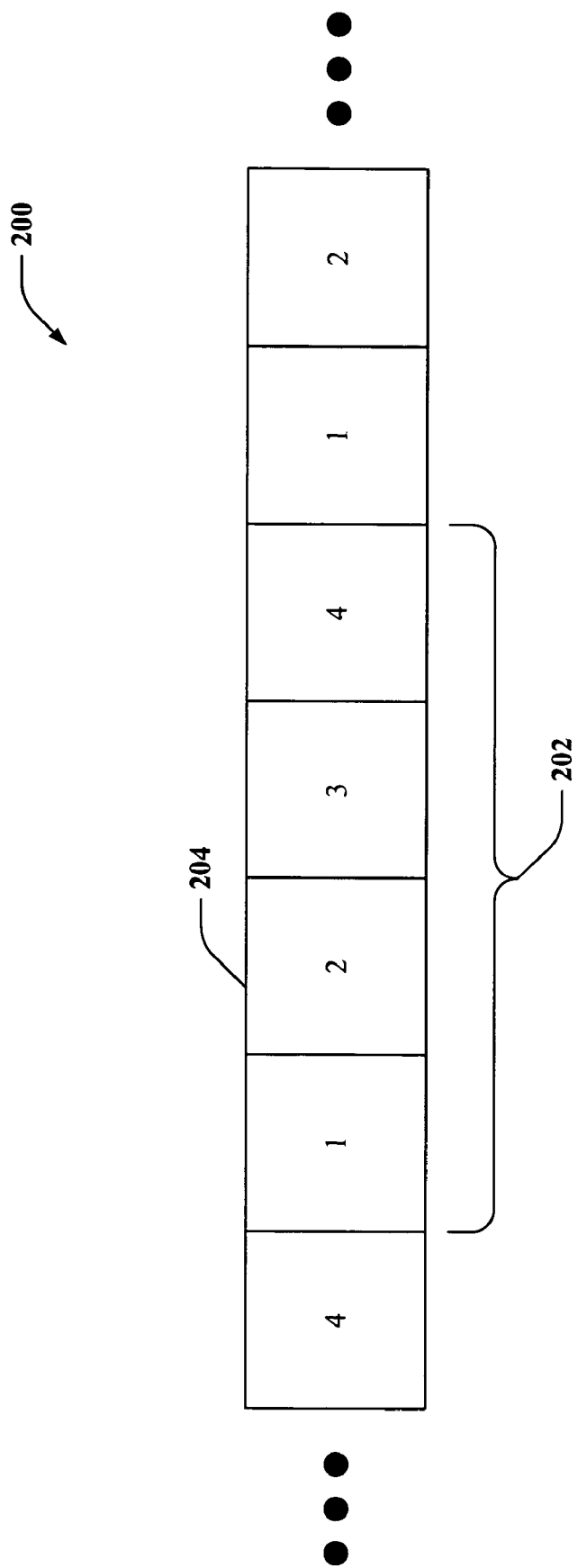
FIG. 2 illustrates a series of transmission time slots that may be utilized to facilitate providing auxiliary MIMO pilots for MIMO access terminals, in accordance with one or more aspects.

FIG. 2 illustrates a series of transmission time slots 200 that may be utilized to facilitate providing auxiliary MIMO pilots for MIMO access terminals, in accordance with one or more aspects. For example, a superslot 202 may comprise a plurality of individual time slots 204. According to the figure, superslot 202 comprises four timeslots 204, although more or fewer time slots may be comprised by superslot 202, as will be appreciated. During each time slot 202 within superslot 204 for a forward link transmission from a base station to an access terminal, information may be transmitted to the access terminal. Such information may comprise communication data (e.g., voice data, audio data, video data, etc.) as well as control information (e.g., pilots, midambles, etc.) that permits the access terminal to estimate a channel over which the communication data is being transmitted.

Figure 3:
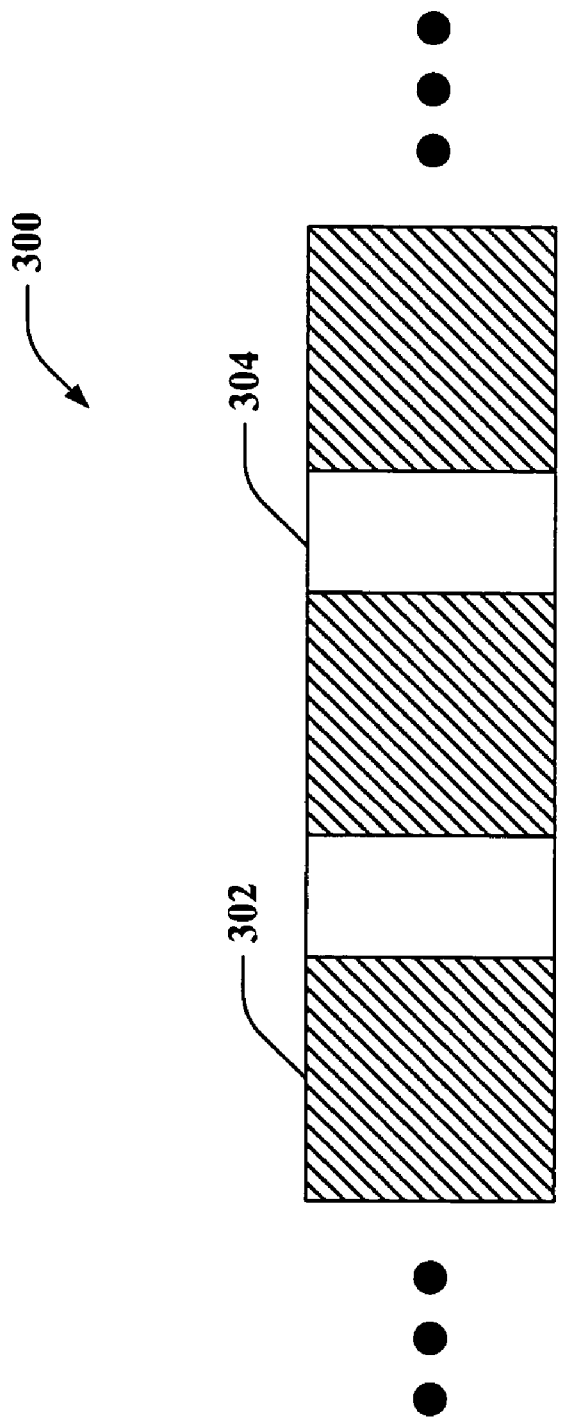
FIG. 3 is an illustration of an expanded time slot that may be utilized to provide auxiliary MIMO pilot signals to an access terminal, in accordance with one or more aspects.

FIG. 3 is an illustration of an expanded time slot 300 that may be utilized to provide auxiliary MIMO pilot signals to an access terminal, in accordance with one or more aspects. According to the figure, a transmission slot 300 may comprise one or more data segments 302 and one or more control segments 304. Control segments 304 may be interspersed between data segments 302 and period intervals. Such intervals may inter be symmetrical, semi-random, etc., according to design preferences and the like. Additionally, control segments may comprise pilot signals on a forward link transmission to permit an access terminal receiving the transmission to estimate a channel over which the transmission is being received. The channel estimation may in turn facilitate reception and/or decoding of the data portions of the signal.

According to an example, a base station may transmit a communication signal during time slot 300, which may comprise OFDM MIMO data. For instance, data transmitted during the data segments 302 may comprise OFDM MIMO data, while control segments 304 are maintained for non-MIMO users (e.g., SISO users and the like) to permit channel estimation. Control segments 304 may comprise information related to SISO pilot signals. However, when a signification time period elapses, during which no MIMO access terminals have been scheduled by the base station, it may be desirable to provide one or more MIMO pilot signals to facilitate permitting a MIMO access terminal to evaluate the signal and estimate the channel. Such auxiliary pilot signals are discussed below with regard to the following figures.

Figure 4:
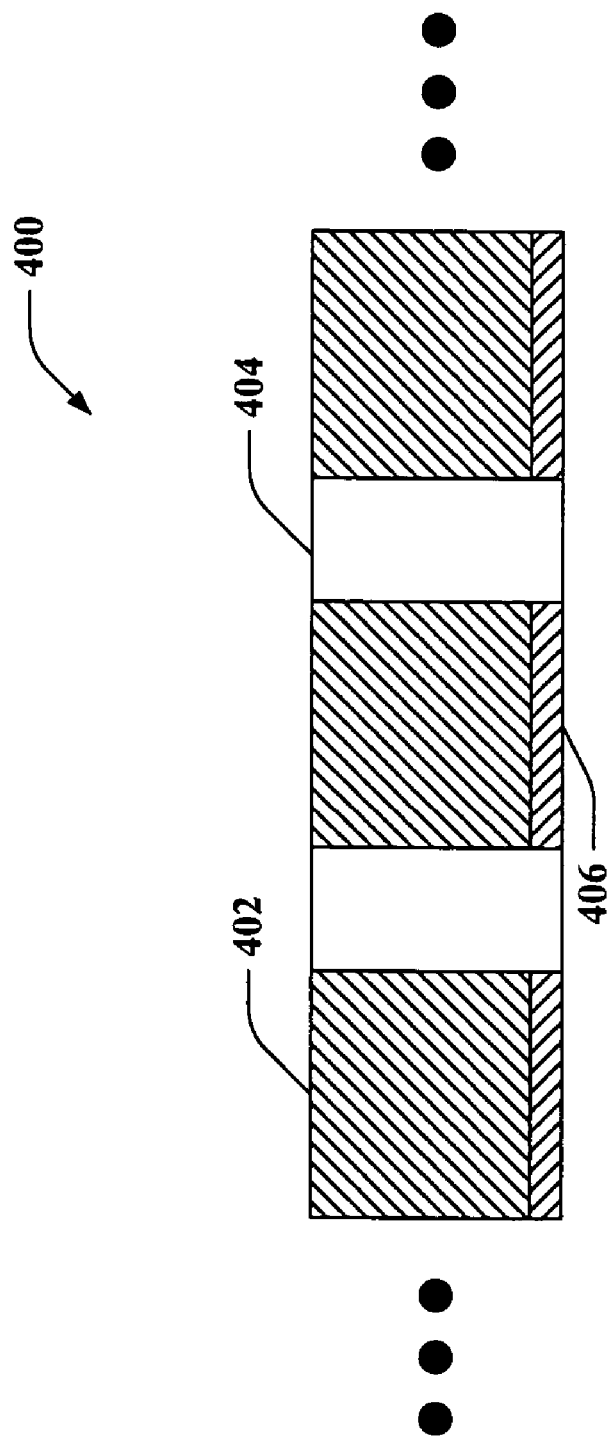
FIG. 4 is an illustration of a transmission time slot comprising auxiliary MIMO pilot signals, in accordance with one or more aspects.

FIG. 4 is an illustration of a transmission time slot 400 comprising auxiliary MIMO pilot signals, in accordance with one or more aspects. The time slot 400 comprises a plurality of data segments 402, which may comprise OFDM MIMO data. Time slot 400 further comprises control segments 404, which may comprise control information such as pilot signals and the like to permit an access terminal to perform a channel estimation protocol. According to some aspects, the control segments 404 may comprise pilot signals for non-MIMO access terminals to ensure that such terminals may perform channel estimation, channel quality index (CQI) assessment, rate prediction, etc.

In a scenario in which a plurality of access terminals comprises both MIMO and non-MIMO access terminals, such as SISO terminals, a base station may transmit the control segments 404 to permit the non-MIMO access terminals to perform the above-described actions. However, MIMO terminals may also decode the data signals comprised in the data segments. In order to provide MIMO access terminals with pilot signals that facilitate predicting data rate in a data segment, auxiliary MIMO pilot signals 406 may be provided by reallocating a portion of the data transmission power in a data segment 402. Each auxiliary pilot 406 may be transmitted at a percentage of total available transmit power (e.g., between 0.5% and 5.0%, between 1.0% and 2.5%, etc.) in order to provide a sufficient pilot power level to permit a MIMO access terminal to perceive the pilot and predict transmission rate while mitigating interference with the remaining data portion of the data segment transmission. That is, during data transmission in each non-MIMO slot 402, auxiliary pilots 406 may be transmitted on unused Walsh codes. A portion of the data power may be reallocated to support the auxiliary pilots 406. In the event that auxiliary pilots 406 are different from each other (e.g., contain different pilot signals, etc.), auxiliary pilots 406 may additionally be time-division multiplexed within the slot or across different slots. MIMO access terminals may thus be provided with access to auxiliary pilots for CQI and rank prediction regardless of a frequency with which a MIMO access terminal is scheduled, while minimizing disruption to existing legacy SISO users. According to other aspects, auxiliary pilots 406 may be transmitted during fewer than all time slots within a super slot. For example, auxiliary pilots may be transmitted during a first time slot in each superslot, such as time slot 1 in super slot 200, although auxiliary pilots may also be transmitted in any other time slots of the super slot 200, in addition to or in place of time slot 1.

Figure 5:
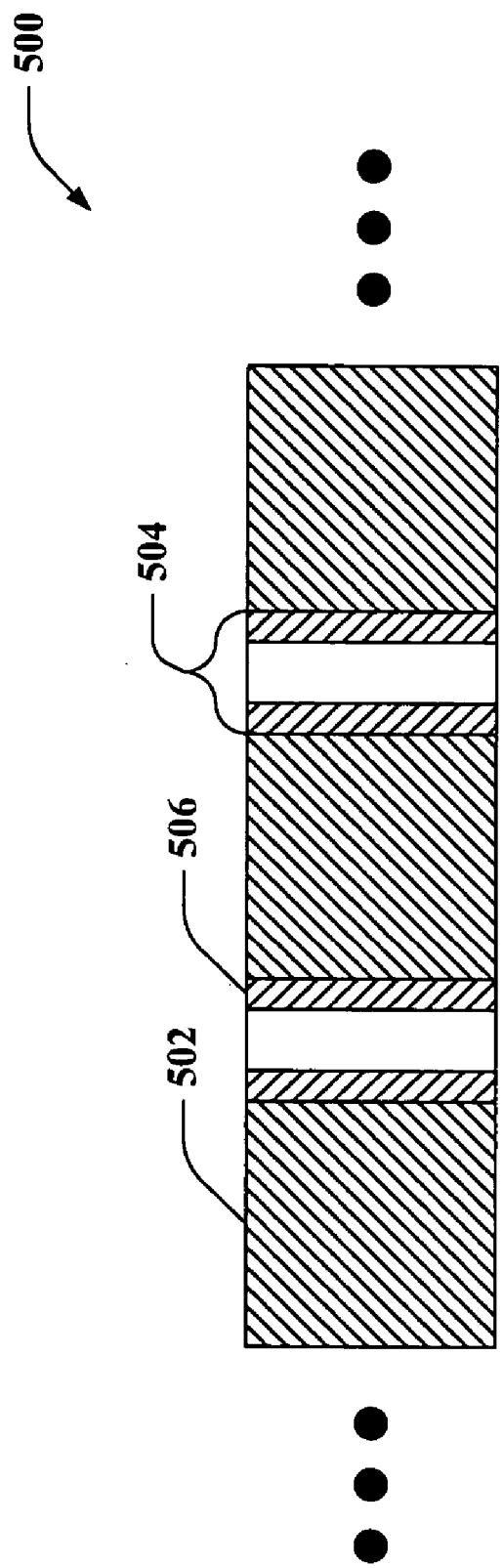
FIG. 5 is an illustration of a time slot during which data and control information may be transmitted to existing non-MIMO legacy access terminal while providing auxiliary MIMO pilot segments for MIMO access terminals to facilitate MIMO demodulation of data segments, in accordance with one or more aspects.

FIG. 5 is an illustration of a time slot 500 during which data and control information may be transmitted to existing non-MIMO legacy access terminal while providing auxiliary MIMO pilot segments for MIMO access terminals to facilitate MIMO demodulation of data segments, in accordance with one or more aspects. Time slot 500 may comprise data segments 502 and control segments 504. Control segments 504 may comprise pilot signal information (e.g., waveforms and the like) for non-MIMO users to facilitate demodulation for a subsequent data segment in time slot 500. Control segments 504 may additionally comprise auxiliary MIMO pilots 506 that provide information to MIMO access terminals to permit such terminals to demodulate a subsequent data segment 502.

According to one or more aspects, during pilot transmission in time slot 500, auxiliary pilots 506 may be transmitted on unused Walsh codes. Some of the non-MIMO pilot power (e.g., approximately 0.5% to 5.0%, etc) may be reallocated to support each auxiliary pilot 506. Auxiliary pilots 506 may be the same pilots or may be different from each other. If different from each other, auxiliary pilots 506 may additionally be time-division multiplexed within each pilot burst or across different bursts. MIMO access terminals may thus be provided with auxiliary pilots 506 for CQI and rank prediction regardless of how often a MIMO access terminal is scheduled, while disruption to existing legacy non-MIMO access terminals is minimized. According to other aspects, auxiliary pilots 506 may be transmitted during fewer than all time slots within a super slot. For example, auxiliary pilots 506 may be transmitted during a first time slot in each superslot, such as time slot 1 in super slot 200, although auxiliary pilots may also be transmitted in any other time slots of the super slot 200, in addition to or in place of time slot 1.

Figure 6:
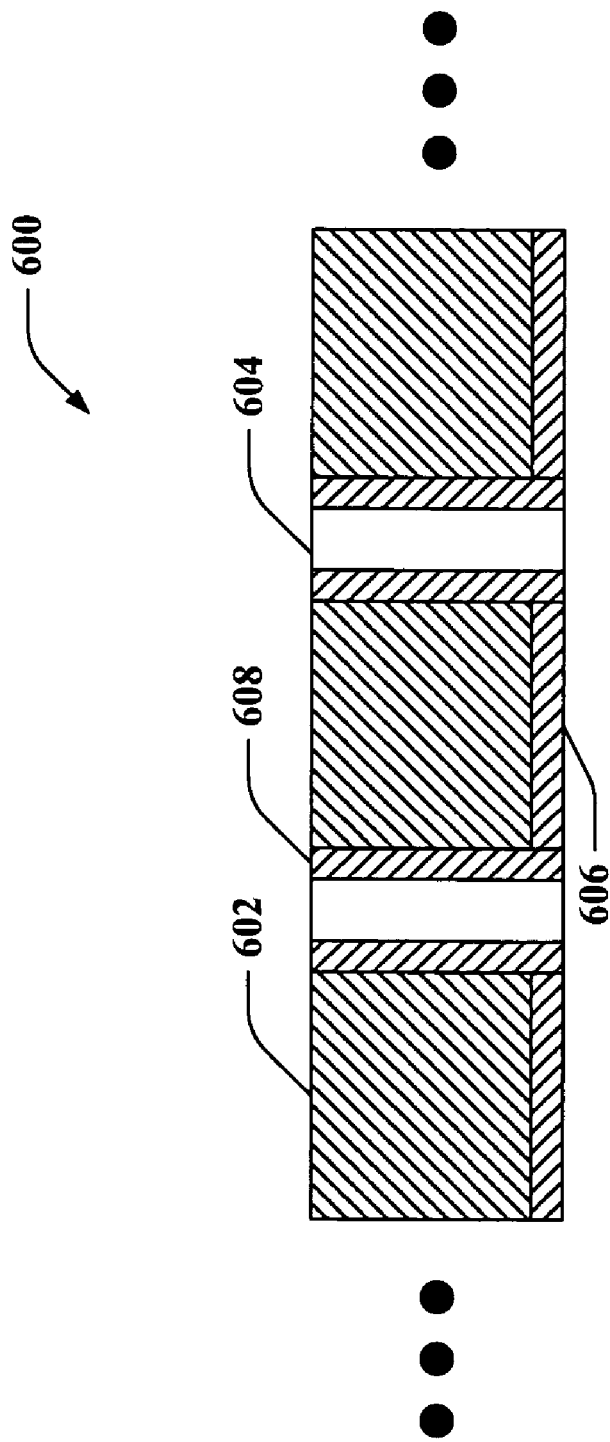
FIG. 6 is an illustration of a time slot during which auxiliary pilot signals are provided for MIMO CQI and rate prediction as well as for MIMO demodulation, in accordance with one or more aspects.

FIG. 6 is an illustration of a time slot 600 during which auxiliary pilot signals are provided for MIMO CQI and rate prediction as well as for MIMO demodulation, in accordance with one or more aspects. Time slot 600 comprises one or more data segments 602, each of which may be preceded by a control segment 604. Control segments 604 may comprise pilot information for non-MIMO access terminals to allow such terminals to perform various actions, such as channel estimation and the like. In the event that a MIMO access terminal is in rage of a base station transmitting during time slot 600, a low-power MIMO pilot signal 606 may be provided by reallocating data transmission power during the data segments 602. For example, a small portion of total available data transmission power (e.g., 0.5%, 1.0%, 2.0%, 2.5%, 3.0%, or some other percentage value or range) may be reallocated to support each MIMO pilot signal. The low-power MIMO pilot(s) 606 may be utilized by a MIMO access terminal to perform CQI and rank prediction. Additionally, if the low-power MIMO pilots 606 comprise different pilot signals relative to each other, they may be time-division multiplexed within the time slot 600 or across multiple time slots.

Control segments 606 may additionally comprise auxiliary MIMO pilots 608, which may be transmitted by a base station at approximately 0.5% to 5.0% of available transmission power and received by a MIMO access terminal to facilitate demodulating a subsequent data segment 602. Auxiliary pilots 608 may be supported by reallocating non-MIMO pilot signal transmission power within control segment 604. Auxiliary pilots 606 and 608 may be transmitted on unused Walsh codes during the data segments 602 and control segments 604, respectively. Transmission of the auxiliary MIMO pilot 606 at low-power mitigates interference caused to a non-MIMO user when decoding a data segment 602, while transmission of the auxiliary MIMO pilot 608 at full power during the control segment 606 facilitates ensuring that a MIMO access terminal receives the auxiliary pilot 608 to permit MIMO demodulation of a subsequent data segment 602. Auxiliary MIMO pilots 608 may be the same pilots or may be different from each other. If different from each other, auxiliary MIMO pilots 608 may be time-division multiplexed within the control segment 604 or across multiple control segments.

According to other aspects, a similar amount of power may be reallocated for auxiliary pilot transmission in both the data segments 602 and pilot control segments 604 (e.g., approximately 1.0-2.5% of transmission power per auxiliary pilot in the data segments 602 and approximately 1.0-2.5% of transmission power per auxiliary pilot in the control segments 604), which can facilitate reducing rate prediction error. In this manner a MIMO user device may be provided with sufficient MIMO pilot information for transmission rate prediction during the data segments 602 of a transmission time slot, while receiving pilot information at a higher power level during the control segments of the time slot to facilitate MIMO data demodulation. According to still other aspects, auxiliary pilots 606 and 608 may be transmitted during fewer than all time slots within a super slot. For example, auxiliary pilots 606 and 608 may be transmitted during a first time slot in each superslot, such as time slot 1 in super slot 200, although auxiliary pilots may also be transmitted in any other time slots of the super slot 200, in addition to or in place of time slot 1.

Figure 7:
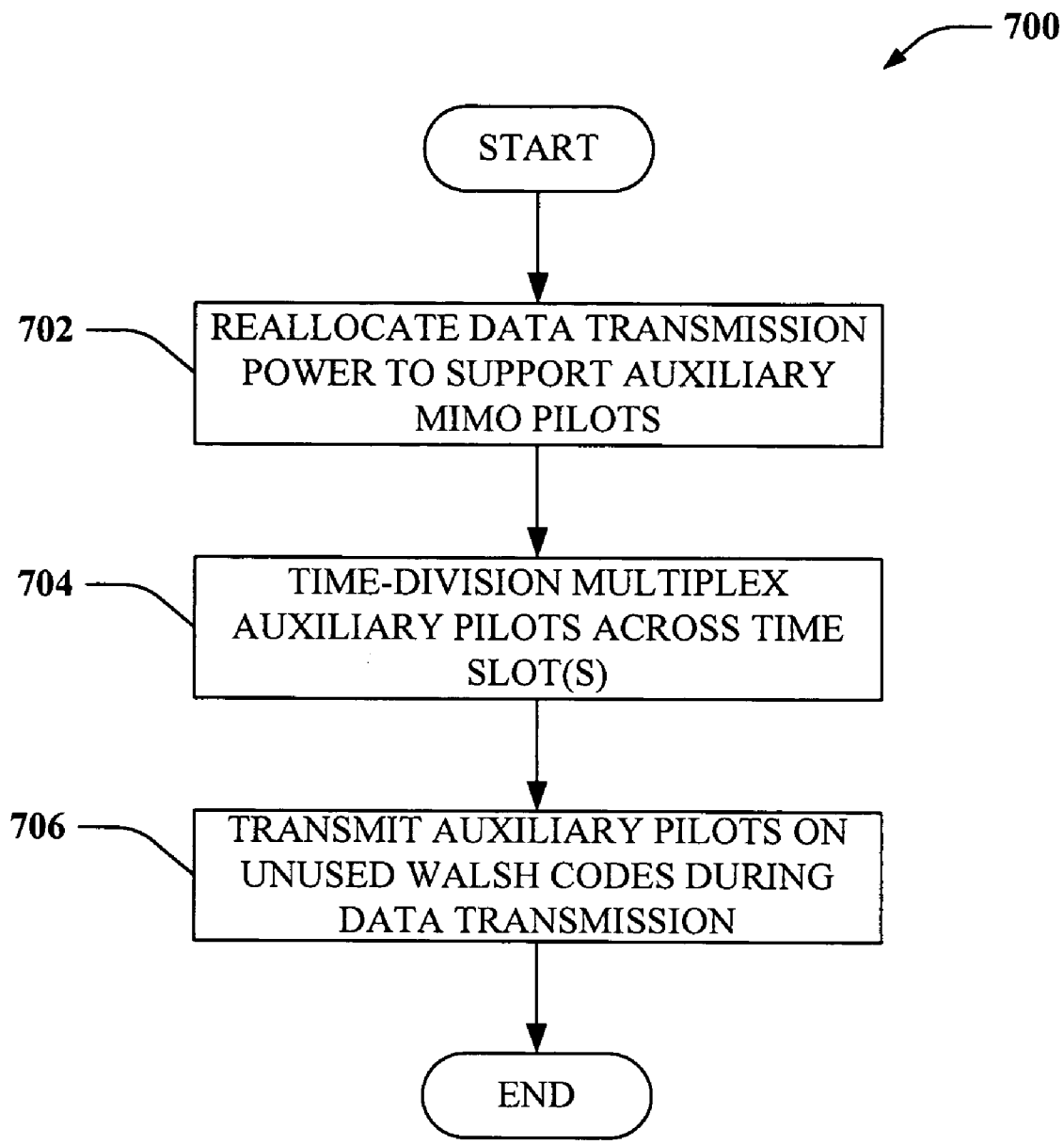
FIG. 7 is an illustration of a method of reallocating data transmission energy to support MIMO pilot signals during a data segment of a transmission time slot, in accordance with one or more aspects.
Figure 8:
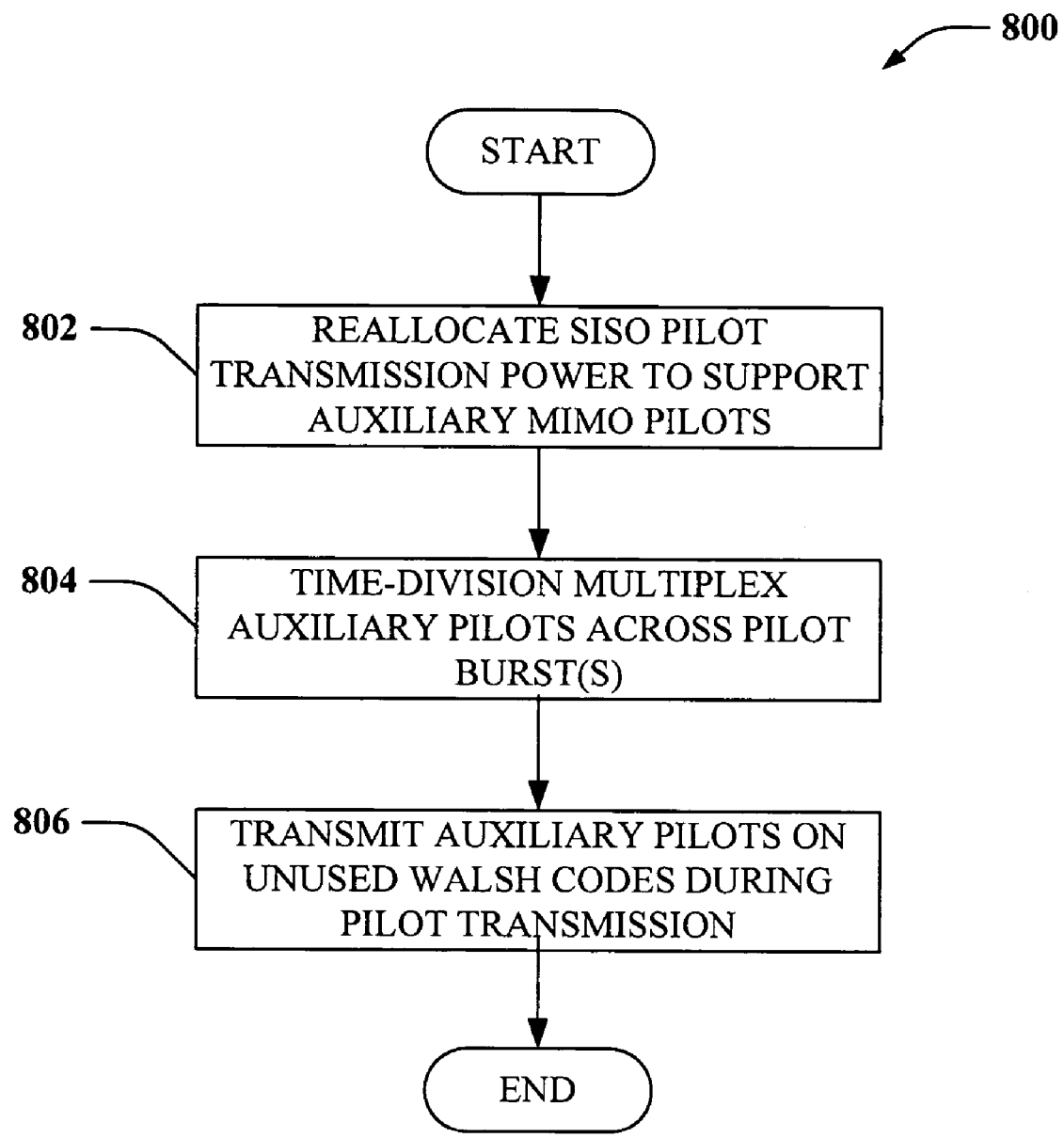
FIG. 8 illustrates a method of providing auxiliary MIMO pilot signals during a control segment of a transmission time slot while maintaining non-MIMO pilot signals, in accordance with one or more aspects described herein.
Figure 9:
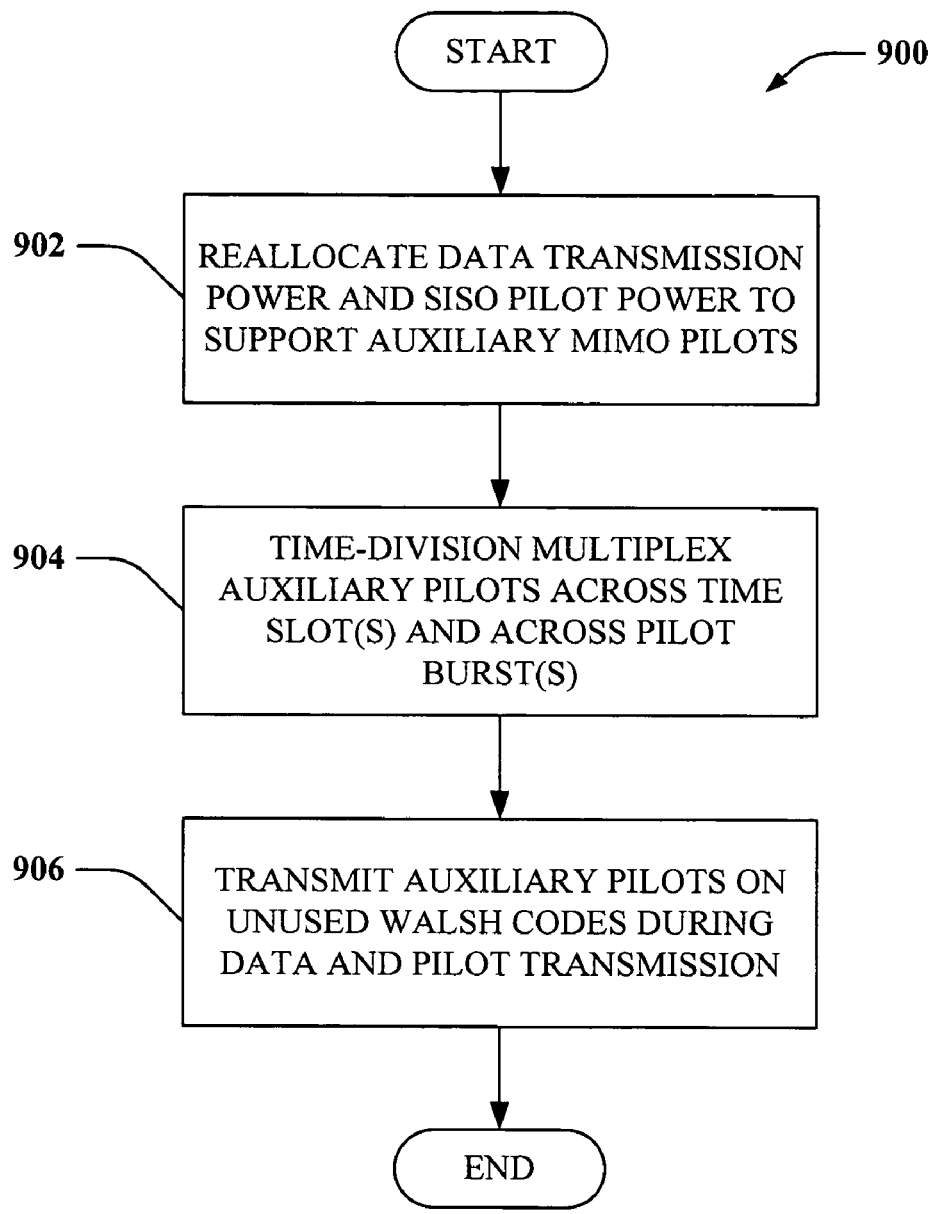
FIG. 9 is an illustration of a methodology for providing auxiliary MIMO pilots to MIMO access terminals while maintaining non-MIMO pilot signals for legacy access terminals, in accordance with one or more aspects.

Referring to FIGS. 7-9, methodologies relating to providing auxiliary MIMO pilots through data power and/or non-MIMO pilot power reallocation in a wireless communication environment are illustrated. For example, methodologies can relate to providing auxiliary MIMO pilots in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 7 is an illustration of a method 700 of reallocating data transmission energy to support MIMO pilot signals during a data segment of a transmission time slot, in accordance with one or more aspects. At 702, a portion of data transmission power may be reallocated for a MIMO pilot signal. The reallocated portion may be a percentage of total available data transmission power. For example, approximately 0.5% to 5.0% may be reallocated for pilot transmission. According to another example, approximately 1.0% to 2.5% of data transmission power, per auxiliary pilot, may be reallocated for MIMO pilot transmission. The auxiliary MIMO pilot signal(s) may be transmitted at low power to permit a receiving MIMO user device or access terminal to perform CQI and rank prediction, in accordance with various aspects.

According to related aspects, when more than one auxiliary MIMO pilot is present (e.g., two or more pilots comprising different MIMO pilot information), the auxiliary pilots may be time-division multiplexed across the time slot in which they are to be transmitted, and/or across multiple time slots, at 704. At 706, the auxiliary pilot(s) may be transmitted using Walsh codes that are otherwise unoccupied during data transmission. In this manner, low-power MIMO pilots can be provided to a MIMO access terminal during a time slot in which MIMO OFDM data is transmitted to facilitate permitting a MIMO access terminal to perform rank and CQI prediction, which in turn facilitates enhancing an end-user's communication experience.

FIG. 8 illustrates a method 800 of providing auxiliary MIMO pilot signals during a control segment of a transmission time slot while maintaining non-MIMO pilot signals, in accordance with one or more aspects described herein. At 802, non-MIMO (e.g., SISO) pilot transmission power (e.g., approximately 0.5 to 5.0% of available SISO pilot transmission power, ...) may be reallocated to support one or more auxiliary MIMO pilot signals in a control segment of a transmission time slot. The auxiliary MIMO pilots may permit a MIMO access terminal to demodulate a data segment in the time slot without detrimentally affecting existing SISO access terminals' ability to receive pilot information and demodulate a communication signal.

At 804, auxiliary MIMO pilot signals may optionally be time-division multiplexed across one or more pilot bursts in the control segment(s). For instance, in the event that more than one unique auxiliary MIMO pilot is to be transmitted, the MIMO pilots may be time-division multiplexed. Auxiliary MIMO pilots may be transmitted, at 806, over unused Walsh codes during pilot transmission in the control segment of the time slot. According to various aspects, auxiliary pilots may be transmitted during fewer than all time slots within a super slot. For example, auxiliary pilots 506 may be transmitted during a first time slot in each superslot, although auxiliary pilots may also be transmitted in any other time slots of the super slot, in addition to or in place of the first time slot.

FIG. 9 is an illustration of a methodology 900 for providing auxiliary MIMO pilots to MIMO access terminals while maintaining non-MIMO pilot signals for legacy access terminals, in accordance with one or more aspects. According to the method, a transmission time slot may comprise OFDM MIMO data that may be decoded by legacy SISO users by providing the SISO users with SISO pilot signals during a control segment in the time slot. MIMO users may also be provided with auxiliary MIMO pilot signals to permit MIMO device decoding of the data segments transmitted in the time slot. For example, at 902, transmission power for the auxiliary MIMO pilot signals may be commandeered and/or reallocated from both data segment transmission power and SISO pilot transmission power. For instance, during data and/or control segments, a portion of transmission power (e.g., 1% to 2.5%, etc.) may be reallocated for auxiliary MIMO pilot transmission. By reallocating only a small percentage of transmission power for transmission of the auxiliary MIMO pilots, transmission of data and control signals is not compromised and MIMO access terminals may be provided with an adequate pilot signal strength for performing rank and/or CQI estimation. Additionally, transmission power may be reallocated from a SISO pilot transmission period (e.g., during a control segment in the time slot) for transmission of auxiliary MIMO pilot signals at a higher power level, in order to facilitate providing a MIMO access terminal with a pilot signal at sufficient strength to permit channel estimation and demodulation of data transmitted in a subsequent data segment in the time slot.

If more than one unique auxiliary MIMO pilot is to be transmitted during the time slot, then at 904, auxiliary MIMO pilots may be time-division multiplexed. For instance, low-power MIMO pilots for which data transmission power has been reallocated may be time-division multiplexed across one or more time slots, while full-power MIMO pilots for which SISO pilot transmission power has been reallocated may be time-division multiplexed across one or more pilot signal bursts. The auxiliary MIMO pilot signals may then be transmitted at 906 using unoccupied Walsh codes in the data segment(s) and control segment(s), respectively. Additionally, auxiliary pilots may be transmitted during fewer than all time slots within a super slot. For example, auxiliary pilots may be transmitted during a first time slot in each superslot and/or in any other time slots of the super slot, in addition to or in place of the first time slot.

Figure 10:
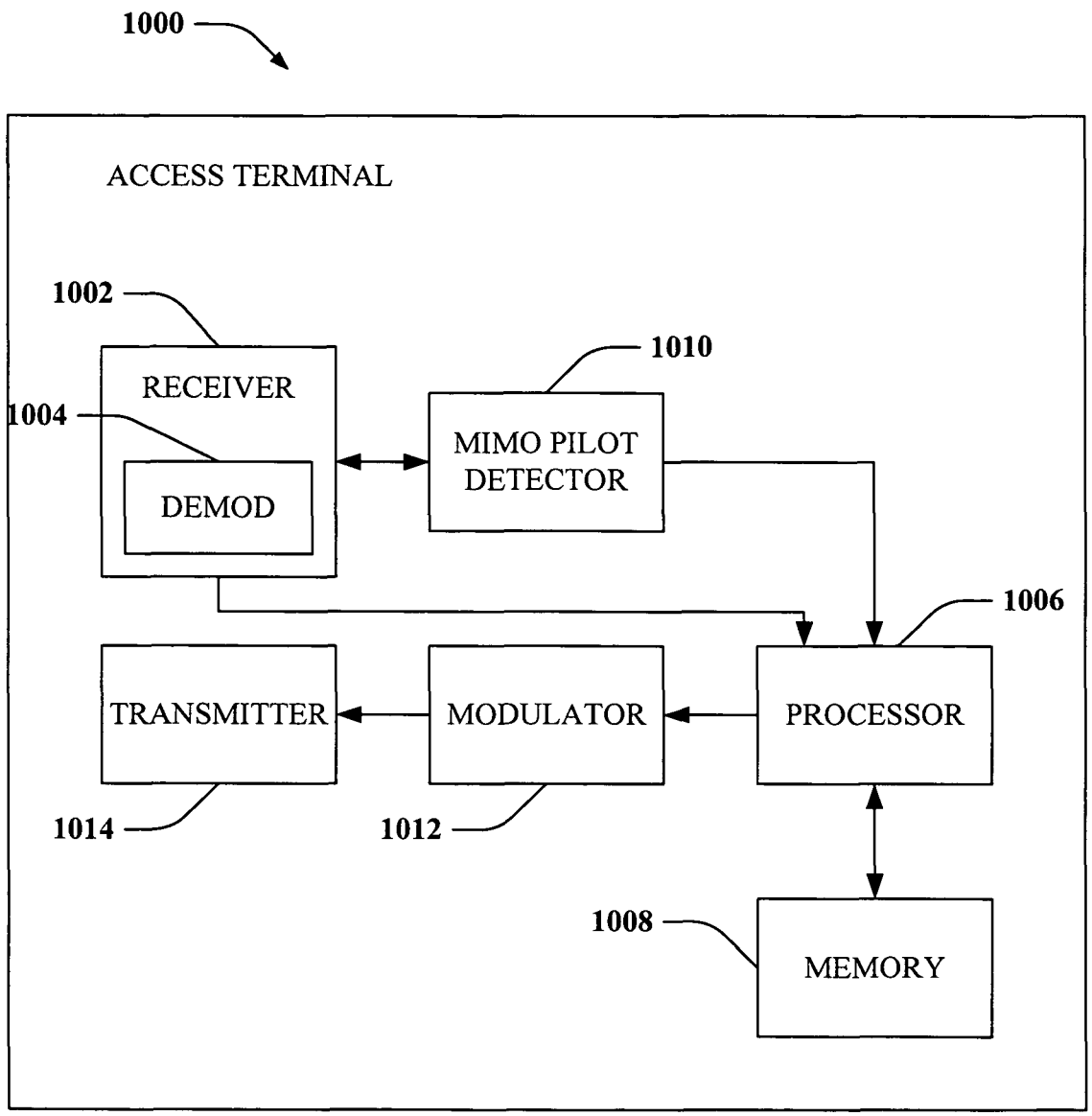
FIG. 10 is an illustration of an access terminal that facilitates detecting auxiliary MIMO pilot signals, in accordance with one or more aspects.

FIG. 10 is an illustration of an access terminal 1000 that facilitates detecting auxiliary MIMO pilot signals, in accordance with one or more aspects. Access terminal 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1014, a processor that controls one or more components of access terminal 1000, and/or a processor that both analyzes information received by receiver 1002, generates information for transmission by transmitter 1014, and controls one or more components of access terminal 1000.

Access terminal 1000 can additionally comprise memory 1008 that is operatively coupled to processor 806 and that may store data to be transmitted, received data, pilot information, and the like. Memory 1008 may store information related to low-power and/or full-power auxiliary MIMO pilots for access terminal 1000, protocols for detecting such pilots and/or for decoding data, protocols for performing channel estimation, rate prediction, rank and CQI prediction, etc.

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1008 of the subject systems and methods is intended to comprise, without being limited to, these and any other suitable types of memory.

Receiver 1002 is further operatively coupled to a MIMO pilot detector 1010, which may detect auxiliary MIMO pilot signals, such as low-power MIMO pilots transmitted during data segments, full-power MIMO pilots transmitted during SISO control segments, etc. Access terminal 1000 still further comprises a modulator 1012 and a transmitter 1014 that transmits a signal to, for instance, a base station, another user device, a remote agent, etc. Although depicted as being separate from the receiver 1002 and the processor 1006, it is to be appreciated that MIMO pilot detector 1010 may be part of processor 806 or a number of processors (not shown), and/or part of receiver 1002.

Figure 11:
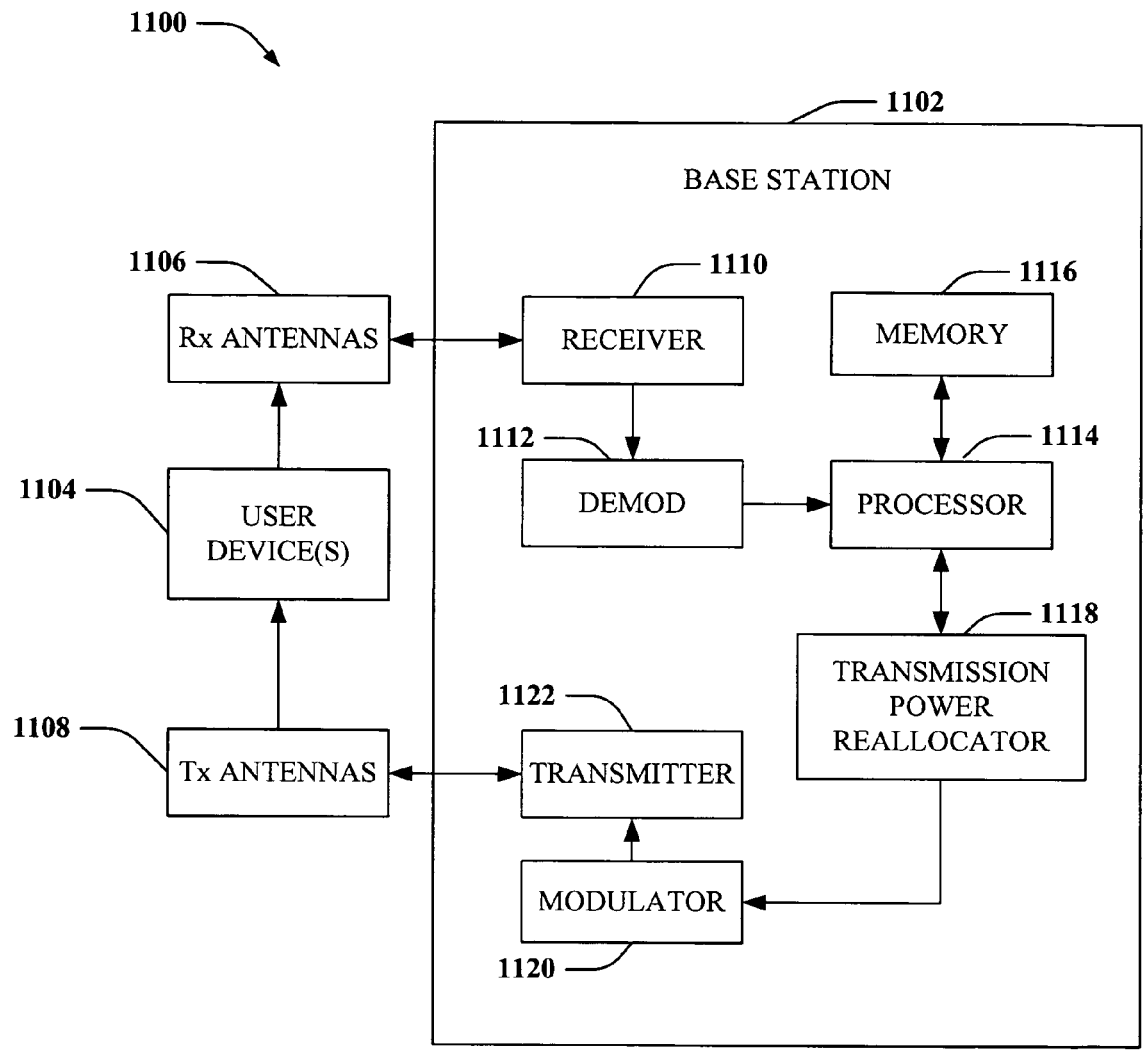
FIG. 11 is an illustration of a system that facilitates reallocating transmission power to provide auxiliary MIMO pilot signals, in accordance with one or more aspects.

FIG. 11 is an illustration of a system 1100 that facilitates reallocating transmission power to provide auxiliary MIMO pilot signals, in accordance with one or more aspects. System 1100 comprises a base station 1102 with a receiver 1110 that receives signal(s) from one or more user devices 1104 through a plurality of receive antennas 1106, and a transmitter 1122 that transmits to the one or more user devices 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to reallocating transmission power associated with forward link communication, generating auxiliary MIMO pilot signals, and/or any other suitable information related to performing the various actions and functions set forth herein.

Processor 1114 may be further coupled to a transmission power reallocator 1118, which may reallocate a small portion of data transmission power for a low-power auxiliary MIMO pilot signal during a data segment in a time slot of a transmission, as well as reallocate transmission power for a high-power auxiliary MIMO pilot for transmission during a non-MIMO control segment in a time slot of a transmission. For example, a low-power MIMO pilot may be supported by a small percentage of data transmission power (e.g., on the order of approximately 1-2.5% of total data transmission power in order to permit a receiving user device to perform rank and CQI estimation, while the high-power MIMO pilot signal is transmitted at sufficient power to permit a receiving user device to demodulate a subsequent data signal. Transmission power reallocator 1118 may be further coupled to a modulator 1120. Modulator 1120 may time-division multiplex auxiliary MIMO pilots for transmission by a transmitter 1122 through antenna 1108 to user device(s) 1104. Although depicted as being separate from processor 1114, it is to be appreciated that transmission power reallocator 1118 and/or modulator 1120 may be part of processor 1114 or may be a number of processors (not shown).

Figure 12:
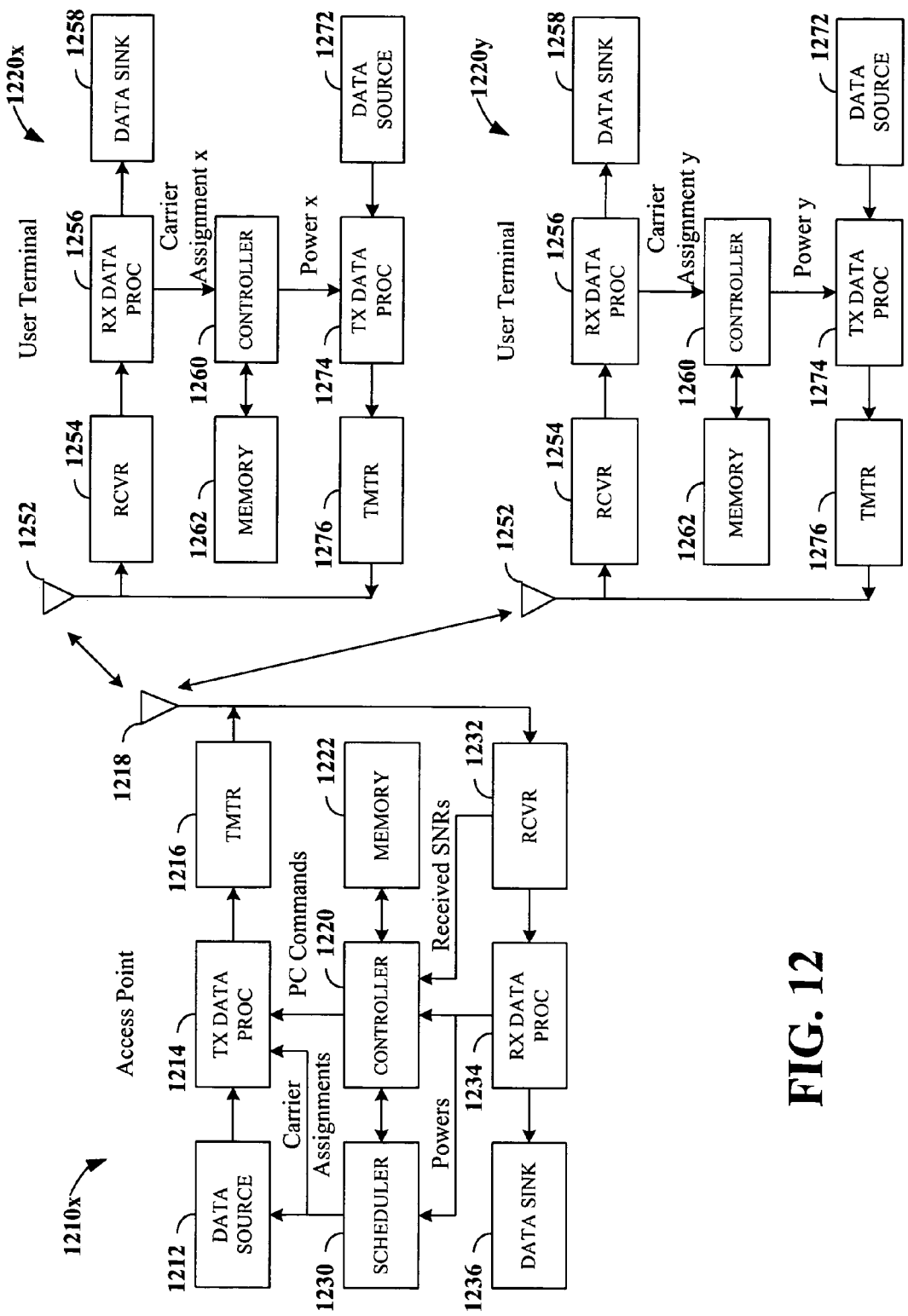
FIG. 12 illustrates an exemplary wireless communication system.

FIG. 12 shows an exemplary wireless communication system 1200. The wireless communication system 1200 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1, 6, 10, 11, and 13) and/or methods (FIGS. 7-9) described herein to facilitate wireless communication there between.

FIG. 12 shows a block diagram of an embodiment of an AP 1210*x* and two ATs 1220*x* and 1220*y* in multiple-access multi-carrier communication system. At AP 1210*x*, a transmit (TX) data processor 1214 receives traffic data (i.e., information bits) from a data source 1212 and signaling and other information from a controller 1220 and a scheduler 1230. For example, controller 1220 may provide power control (PC) commands that are used to adjust the transmit power of the active ATs, and scheduler 1230 may provide assignments of carriers for the ATs. These various types of data may be sent on different transport channels. TX data processor 1214 encodes and modulates the received data using multi-carrier modulation (e.g., OFDM) to provide modulated data (e.g., OFDM symbols). A transmitter unit (TMTR) 1216 then processes the modulated data to generate a downlink-modulated signal that is then transmitted from an antenna 1218.

At each of ATs 1220x and 1220y, the transmitted and modulated signal is received by an antenna 1252 and provided to a receiver unit (RCVR) 1254. Receiver unit 1254 processes and digitizes the received signal to provide samples. A received (RX) data processor 1256 then demodulates and decodes the samples to provide decoded data, which may include recovered traffic data, messages, signaling, and so on. The traffic data may be provided to a data sink 1258, and the carrier assignment and PC commands sent for the terminal are provided to a controller 1260. Controller 1260 may be configured to carryout the schemes describe above.

For each active terminal 1220, a TX data processor 1274 receives traffic data from a data source 1272 and signaling and other information from controller 1260. For example, controller 1260 may provide information indicative of the required transmit power, the maximum transmit power, or the difference between the maximum and required transmit powers for the terminal. The various types of data are coded and modulated by TX data processor 1274 using the assigned carriers and further processed by a transmitter unit 1276 to generate an uplink modulated signal that is then transmitted from antenna 1252.

At AP 1210x, the transmitted and modulated signals from the ATs are received by antenna 1218, processed by a receiver unit 1232, and demodulated and decoded by an RX data processor 1234. Receiver unit 1232 may estimate the received signal quality (e.g., the received signal-to-noise ratio (SNR)) for each terminal and provide this information to controller 1220. Controller 1220 may then derive the PC commands for each terminal such that the received signal quality for the terminal is maintained within an acceptable range. RX data processor 1234 provides the recovered feedback information (e.g., the required transmit power) for each terminal to controller 1220 and scheduler 1230.

The techniques described herein may be implemented by various means. For example, these techniques may be implemented in hardware, software, or a combination thereof. For a hardware implementation, the processing units (e.g., controllers 1220 and 1270, TX and RX processors 1214 and 1234, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 13:
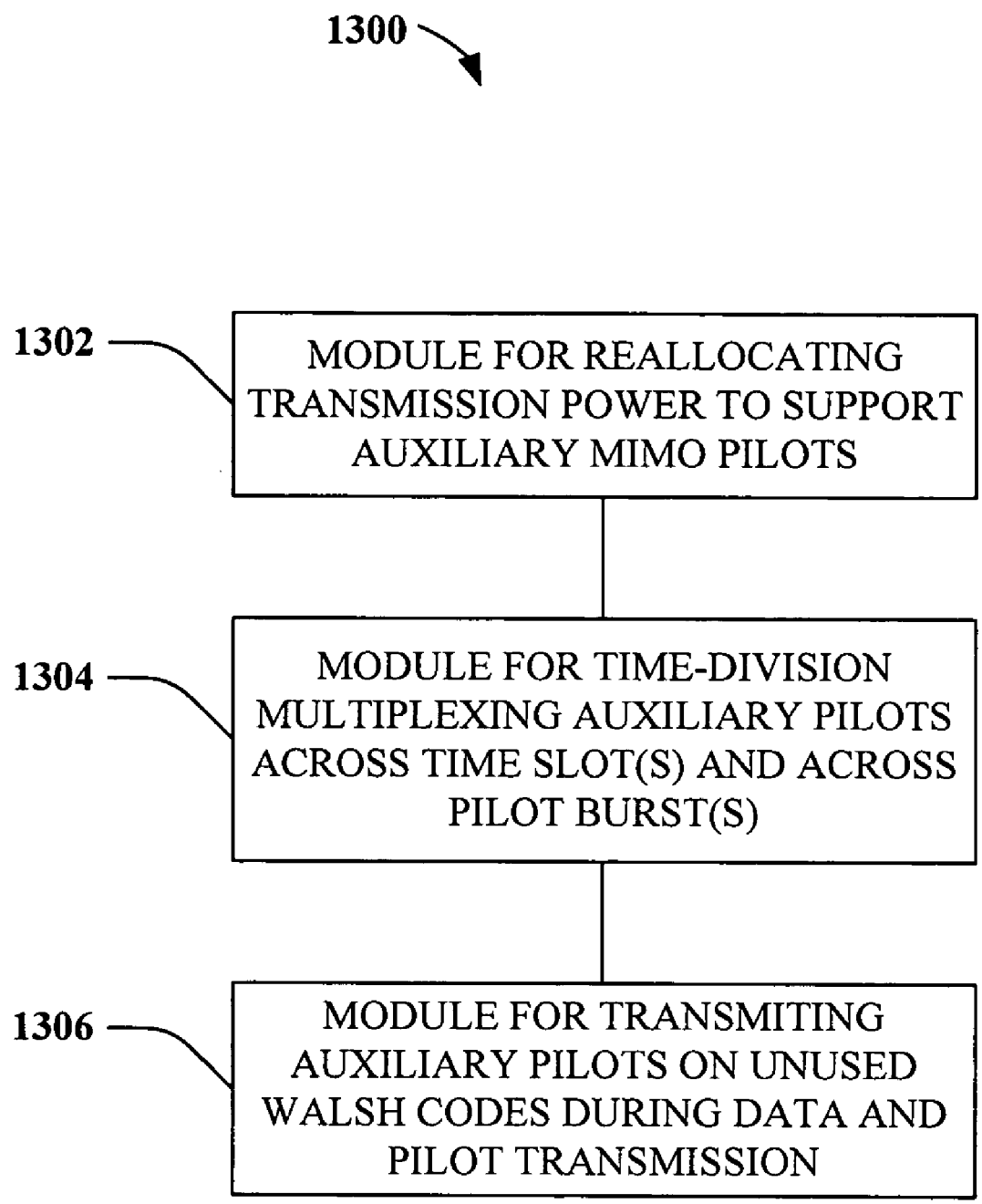
FIG. 13 illustrates an apparatus that facilitates providing auxiliary MIMO pilot signals in a wireless communication environment, in accordance with various aspects.

FIG. 13 illustrates an apparatus 1300 that facilitates providing auxiliary MIMO pilot signals in a wireless communication environment, in accordance with various aspects. Apparatus 1300 is represented as a series of interrelated functional blocks, or "modules," which can represent functions implemented by a processor, software, or combination thereof (e.g., firmware). For example, apparatus 1300 may provide modules for performing various acts such as are described above with regard to the preceding figures. Apparatus 1300 comprises a module for reallocating transmission power 1302 to support auxiliary MIMO pilots. Module for reallocating transmission power 1302 may reallocate a portion of available transmission power in a data or control segment of a transmission time slot. For example, approximately 1.0-2.5% of available transmission power may be reallocated for MIMO pilot transmission in order to provide a MIMO access terminal with a sufficiently detectable MIMO pilot for CQI and rank prediction while reserving the vast majority of data transmission power for data transmission. The low power MIMO pilot is thus kept small enough to mitigate interference with data waveforms in the data segment. Additionally or alternatively, the module for reallocating transmission power 1302 may reallocate non-MIMO pilot transmission power in a control segment of the time slot. An auxiliary MIMO pilot for which non-MIMO pilot power is reallocated may be transmitted a sufficiently high percentage of total transmission power (e.g., 5%, 50%, 100%, or some other suitable percentage) to ensure that a receiving MIMO access terminal receives a sufficiently strong signal to permit demodulation of a subsequent data signal in the time slot.

Apparatus 1300 may additionally comprise a module for time-division multiplexing different auxiliary MIMO pilot signals. For instance, low-power auxiliary MIMO pilots may be time-division multiplexed across one or more time slots, while non-MIMO pilot-power auxiliary MIMO pilot signals may be time-division multiplexed across one or more pilot bursts in control segment(s). Apparatus 1300 may still further comprise a module for transmitting 1306 that transmits auxiliary MIMO pilots using unoccupied Walsh codes during respective segments within a time slot. It will be appreciated that the various modules described here may comprise any and all necessary structure (e.g., hardware and/or software) to execute the various methods described herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing auxiliary pilots for transmission from a base station in a wireless communication system with MIMO and non-MIMO users, comprising:
    allocating a portion of total available data transmission power for transmission of at least one auxiliary multiple-input, multiple-output(MIMO) pilot during a data segment in a transmission time slot; and
    transmitting the at least one auxiliary MIMO pilot simultaneously with a primary pilot to both the MIMO and the non-MIMO users on one or more unused Walsh codes during the transmission time slot, wherein the at least one auxiliary MIMO pilot only supports the MIMO users in the wireless communication system.

2. The method of claim 1, further comprising time-division multiplexing the at least one auxiliary MIMO pilot.

3. The method of claim 1, further comprising allocating approximately 1% to 2.5% of the total available data transmission power for transmission of the at least one auxiliary MIMO pilot during the data segment in the transmission time slot.

4. The method of claim 1, further comprising allocating non-MIMO pilot transmission power for transmission of the at least one auxiliary MIMO pilot during a control segment in the transmission time slot.

5. The method of claim 4, further comprising allocating approximately 1% to 2.5% of available SISO pilot transmission power for transmission of the at least one auxiliary MIMO pilot during the control segment in the transmission time slot.

6. The method of claim 1, further comprising allocating approximately 0.5% to 3.0% of the total available data transmission power for transmission of the at least one auxiliary MIMO pilot during a data segment in the transmission time slot.

7. An apparatus that facilitates providing auxiliary multiple-input, multiple-output(MIMO) pilots for transmission from a base station in a wireless communication system with MIMO and non-MIMO users, comprising:
    a processor that allocates a portion of total available data transmission power for transmission of at least one auxiliary MIMO pilot signal during a data segment in a transmission time slot; and
    a transmitter that transmits the at least one auxiliary MIMO pilot signal simultaneously with a primary pilot to both the MIMO and the non-MIMO users on one or more unused Walsh codes during the transmission time slot, wherein the at least one auxiliary MIMO pilot only supports the MIMO users in the wireless communication system.

8. The apparatus of claim 7, further comprising a modulator that time-division multiplexes the at least one auxiliary MIMO pilot signal.

9. The apparatus of claim 7, wherein the processor allocates approximately 0.5% to 3.0% of the total available data transmission power for transmission of the at least one auxiliary MIMO pilot signal during the data segment in the transmission time slot.

10. The apparatus of claim 7, wherein the processor allocates non-MIMO pilot transmission power for transmission of the at least one auxiliary MIMO pilot signal during a control segment in the transmission time slot.

11. The apparatus of claim 10, wherein the processor allocates approximately 0.5% to 3.0% of available SISO pilot transmission power for transmission of the at least one auxiliary MIMO pilot signal during the control segment in the transmission time slot.

12. The apparatus of claim 7, wherein the processor allocates approximately 1.0% to 2.5% of the total available data transmission power for transmission of the at least one auxiliary MIMO pilot signal during a data segment in the transmission time slot.

13. A wireless communication apparatus in a wireless communication system with MIMO and non-MIMO users, comprising:
    means for allocating a portion of total available data transmission power for transmission of an auxiliary multiple-input, multiple-output(MIMO) pilot during a data segment in a transmission time slot;
    means for time-division multiplexing auxiliary MIMO pilots; and
    means for transmitting the auxiliary MIMO pilot simultaneously with a primary pilot to both the MIMO and the non-MIMO users on one or more unused Walsh codes during the transmission time slot, wherein the auxiliary MIMO pilot only supports the MIMO users in the wireless communication system.

14. The apparatus of claim 13, wherein the means for allocating allocates less than approximately 3% of the total available data transmission power for transmission of the auxiliary MIMO pilot during the data segment in the transmission time slot.

15. The apparatus of claim 13, wherein the means for allocating allocates non-MIMO pilot transmission power for transmission of the auxiliary MIMO pilot during a control segment in the transmission time slot.

16. The apparatus of claim 15, wherein the means for allocating allocates less than approximately 3% of total SISO pilot transmission power for transmission of the auxiliary MIMO pilot during the control segment in the transmission time slot.

17. The apparatus of claim 13, wherein the means for allocating allocates approximately 0.5% to 3.0% of the total available data transmission power for transmission of the auxiliary MIMO pilot during a data segment in the transmission time slot.

18. A non-transitory computer-readable medium that stores computer-executable instructions for providing auxiliary MIMO pilots in a wireless communication system with MIMO and non-MIMO users, the computer-executable instructions for:
    allocating a portion of total available data transmission power for transmission of an auxiliary multiple-input, multiple-output(MIMO) pilot during a data segment in a transmission time slot;
    time-division multiplexing auxiliary MIMO pilots; and
    transmitting the auxiliary MIMO pilot simultaneously with a primary pilot to both the MIMO and the non-MIMO users on one or more unused Walsh codes during the transmission time slot, wherein the auxiliary MIMO pilot only supports the MIMO users in the wireless communication system.

19. The non-transitory computer-readable medium of claim 18, further comprising instructions for allocating less than approximately 4% of the total available data transmission power for transmission of the auxiliary MIMO pilot during the data segment in the transmission time slot.

20. The non-transitory computer-readable medium of claim 18, further comprising instructions for allocating non-MIMO pilot transmission power for transmission of the auxiliary MIMO pilot during a control segment in the transmission time slot.

21. The non-transitory computer-readable medium of claim 20, further comprising instructions for allocating less than approximately 4% of total SISO pilot transmission power for transmission of the auxiliary MIMO pilot during the control segment in the transmission time slot.

22. The non-transitory computer-readable medium of claim 18, further comprising instructions for allocating approximately 0.5% to 3.0% of the total available data transmission power for transmission of the auxiliary MIMO pilot during a data segment in the transmission time slot.

23. A processor that executes computer-executable instructions for providing auxiliary MIMO pilots from a base station in a wireless communication system with MIMO and non-MIMO users, the instructions comprising:
    allocating a portion of total available data transmission power for transmission of an auxiliary multiple-input, multiple-output(MIMO) pilot during a data segment in a transmission time slot;
    time-division multiplexing the auxiliary MIMO pilot; and
    transmitting the auxiliary MIMO pilot to both the MIMO and the non-MIMO users on one or more unused Walsh codes during the transmission time slot, wherein the auxiliary MIMO pilot only supports the MIMO users in the wireless communication system.

24. The processor of claim 23, the instructions further comprising allocating less than approximately 5% of the total available data transmission power for transmission of the auxiliary MIMO pilot during the data segment in the transmission time slot.

25. The processor of claim 23, the instructions further comprising allocating non-MIMO pilot transmission power for transmission of the auxiliary MIMO pilot during a control segment in the transmission time slot.

26. The processor of claim 25, the instructions further comprising allocating less than approximately 5% of total SISO pilot transmission power for transmission of the auxiliary MIMO pilot during the control segment in the transmission time slot.

27. The processor of claim 23, the instructions further comprising allocating approximately 0.5% to 4.0% of the total available data transmission power for transmission of the auxiliary MIMO pilot during a data segment in the transmission time slot.

* * * * *